US008237745B1

(12) United States Patent
Cornell et al.

(10) Patent No.: US 8,237,745 B1
(45) Date of Patent: Aug. 7, 2012

(54) LABEL POSITIONING TECHNIQUE TO REDUCE CRAWLING DURING ZOOM ACTIVITIES

(75) Inventors: Brian Cornell, Kenmore, WA (US); Jennifer Maurer, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/244,742

(22) Filed: Sep. 26, 2011

(51) Int. Cl.
G09G 5/00 (2006.01)
(52) U.S. Cl. .......................................... 345/660
(58) Field of Classification Search .................. 345/660
See application file for complete search history.

(56) References Cited

U.S. PATENT DOCUMENTS

| | | | |
|---|---|---|---|
| 5,297,051 A | | 3/1994 | Arakawa et al. |
| 5,684,940 A | | 11/1997 | Freeman et al. |
| 5,742,072 A | | 4/1998 | Maeda |
| 5,988,853 A | | 11/1999 | Kim et al. |
| 6,011,494 A | | 1/2000 | Watanabe et al. |
| 6,405,129 B1 | * | 6/2002 | Yokota ........................ 701/208 |
| 6,565,610 B1 | * | 5/2003 | Wang et al. .................. 715/210 |
| 7,076,409 B2 | | 7/2006 | Agrawala et al. |
| 7,076,505 B2 | * | 7/2006 | Campbell ........................ 1/1 |
| 7,414,637 B2 | | 8/2008 | Fogel et al. |
| 7,425,968 B2 | | 9/2008 | Gelber |
| 7,599,792 B1 | * | 10/2009 | Smith .......................... 701/209 |
| 7,692,655 B2 | | 4/2010 | Ni |
| 2004/0252137 A1 | | 12/2004 | Gelber |
| 2005/0243104 A1 | | 11/2005 | Kinghorn |
| 2006/0058949 A1 | | 3/2006 | Fogel et al. |
| 2007/0229513 A1 | | 10/2007 | Bowman |
| 2007/0229538 A1 | | 10/2007 | Klassen et al. |
| 2007/0233379 A1 | | 10/2007 | Bowman et al. |
| 2007/0242084 A1 | | 10/2007 | Bowman et al. |
| 2008/0306684 A1 | * | 12/2008 | Yamazaki ..................... 701/208 |
| 2009/0119009 A1 | | 5/2009 | Dicke |
| 2009/0216436 A1 | | 8/2009 | Liu |
| 2009/0244095 A1 | | 10/2009 | Bowman et al. |
| 2010/0097399 A1 | | 4/2010 | Rajagopalan et al. |
| 2010/0217521 A1 | | 8/2010 | Tysowski |

OTHER PUBLICATIONS

Bing Maps AJAX Control, Version 7.0 (2011).

* cited by examiner

*Primary Examiner* — Edward Martello
(74) *Attorney, Agent, or Firm* — Marshall, Gerstein & Borun LLP

(57) ABSTRACT

A graphics or image rendering system, such as a map image rendering system, receives image data from an image database in the form of vector data that defines various features of the map, such as roads, boundaries, etc., in addition to text strings or symbols to be displayed with the features to provide, for example, labels for the features. The label positioning technique generally divides the displayed road feature into a number of road segments and then labels each road segment in a sequence based on an ordered set of labels and a position of each road segment.

25 Claims, 13 Drawing Sheets

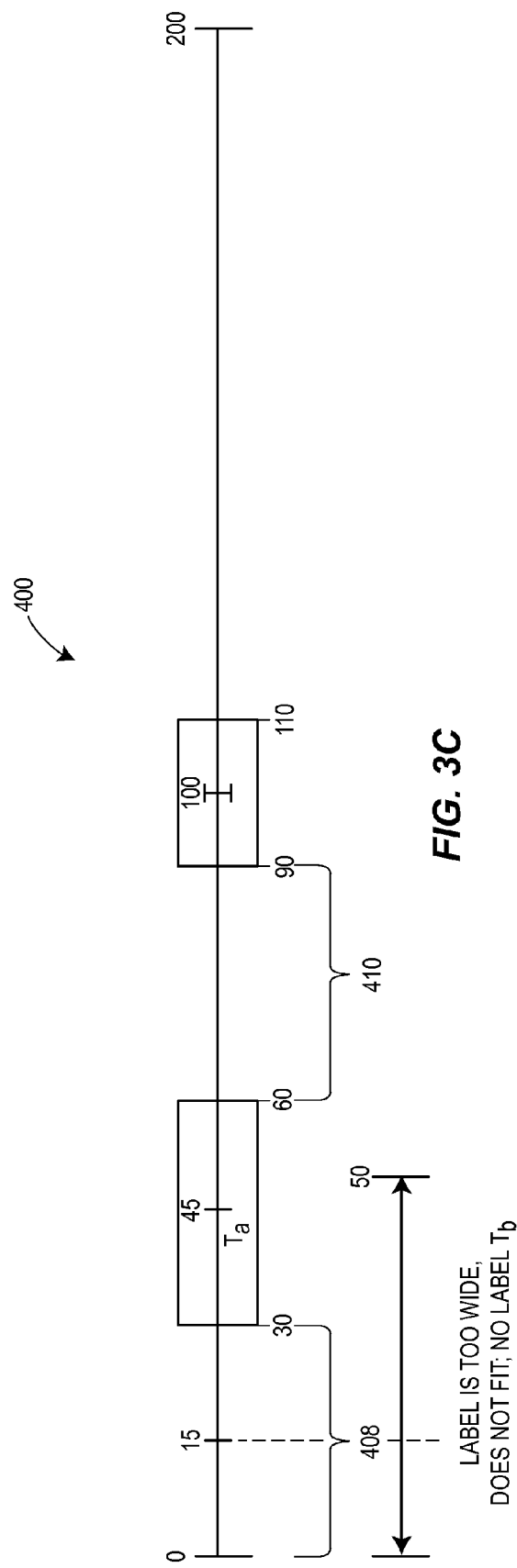

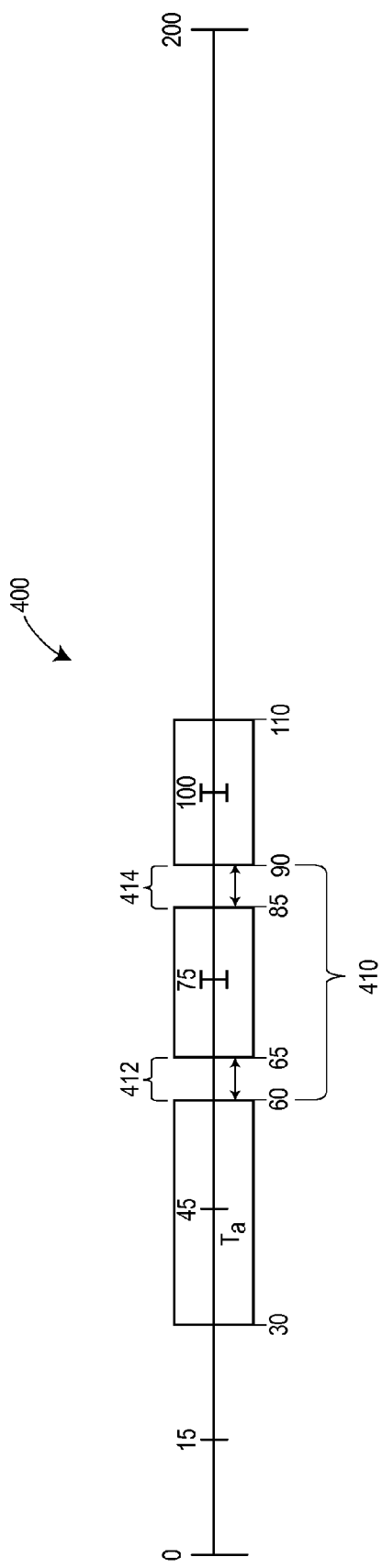

LABEL POSITIONING TECHNIQUE TO REDUCE CRAWLING DURING ZOOM ACTIVITIES

FIELD OF TECHNOLOGY

The present disclosure relates to image rendering systems, such as electronic map display systems, and more specifically to an image rendering engine that renders a label of a feature of an electronic map in a manner that reduces a crawling motion of the labels while changing zooming levels of the map.

BACKGROUND

Digital maps are found in and may be displayed by a wide variety of devices, including mobile phones, car navigation systems, hand-held GPS units, computers, and many websites. Although digital maps are easy to view and to use from an end-user's perspective, creating a digital map is a difficult task and can be a time-consuming process. In particular, every digital map begins with storing, in a map database, a set of raw data corresponding to millions of streets and intersections and other features to be displayed as part of a map. The raw map data that is stored in the map database and that is used to generate digital map images is derived from a variety of sources, with each source typically providing different amounts and types of information. This map data must therefore be compiled and stored in the map database before being accessed by map display or map rendering applications and hardware.

There are, of course, different manners of digitally rendering map images (referred to as digital map images) based on map data stored in a map database. One method of rendering a map image is to store map images within the map database as sets of raster or pixilated images made up of numerous pixel data points, with each pixel data point including properties defining how a particular pixel in an image is to be displayed on an electronic display device. While this type of map data is relatively easy to create and store, the map rendering technique using this data typically requires a large amount of storage space for comprehensive digital map images, and it is difficult to manipulate the digital map images as displayed on a display device in very many useful manners.

Another, more flexible methodology of rendering images uses what is traditionally called vector image data. Vector image data is typically used in high-resolution and fast-moving imaging systems, such as those associated with gaming systems, and in particular three-dimensional gaming systems. Generally speaking, vector image data (or vector data) includes data that defines specific image objects or elements (also referred to as primitives) to be displayed as part of an image via an image display device. In the context of a map image, such image elements or primitives may be, for example, individual roads, text labels, areas, text boxes, buildings, points of interest markers, terrain features, bike paths, map or street labels, etc. Each image element may generally be drawn as a set of one or more triangles (of different sizes, shapes, colors, fill patterns, etc.), with each triangle including three vertices interconnected by lines. For any particular image element, the image database may store a set of vertex data points that may be used to generate one or more of the triangles. Generally speaking, each vertex data point includes data pertaining to a two-dimensional or a three-dimensional position of the vertex (in an X, Y or an X, Y, Z coordinate system, for example) and various vertex attributes defining properties of the vertex, such as color properties, fill properties, line width properties for lines emanating from the vertex, etc.

During the image rendering process, the vertices defined for various image elements of an image to be rendered are provided to and are processed in one or more image shaders which operate in conjunction with a graphics processing unit (GPU), such as a graphics card or a rasterizer, to produce a two-dimensional image on a display screen. Generally speaking, an image shader is a set of software instructions used primarily to calculate rendering effects on graphics hardware with a high degree of flexibility. Image shaders are well known in the art and various types of image shaders are available in various application programming interfaces (APIs) provided by, for example, OpenGL and Direct3D, to define special shading functions. Basically, image shaders are simple programs in a high level programming language that describe or determine the traits of either a vertex or a pixel. Vertex shaders, for example, define the traits (e.g., position, texture coordinates, colors, etc.) of a vertex, while pixel or fragment shaders define the traits (color, z-depth and alpha value) of a pixel. A vertex shader is called for each vertex in an image element or primitive so that, for each vertex input into the vertex shader, the vertex shader produces one (updated) vertex output. Each vertex output by the vertex shader is then rendered as a series of pixels onto a block of memory that will eventually be sent to a display screen.

As a more particular example of image shader technology, Direct3D and OpenGL graphic libraries use three basic types of shaders including vertex shaders, geometry shaders, and pixel or fragment shaders. Vertex shaders are run once for each vertex given to the graphics processor. As noted above, the purpose of a vertex shader is to transform a position of a vertex in a virtual space to the two-dimensional coordinate at which it appears on the display screen (as well as a depth value for the z-buffer of the graphics processor). Vertex shaders can manipulate properties such as position, color, and texture coordinates by setting vertex attributes of the vertices, but cannot create new vertices. The output of the vertex shader is provided to the next stage in the processing pipeline, which is either a geometry shader if present or the rasterizer. Geometry shaders can add and remove vertices from a mesh of vertices and can be used to generate image geometry procedurally or to add volumetric detail to existing images that would be too costly to process on a central processing unit (CPU). If geometry shaders are being used, the output is then sent to the rasterizer. Pixel shaders, which are also known as fragment shaders, calculate the color and light properties of individual pixels in an image. The input to this stage comes from the rasterizer, and the fragment shaders operate to fill in the pixel values of the polygons being sent through the graphics pipeline. Fragment shaders are typically used for scene lighting and related effects such as color toning. There is not a one-to-one relationship between calls to the fragment shader and pixels on the screen as fragment shaders are often called many times per pixel because they are called for every image element or object that is in the corresponding space, even if that image object is occluded.

The use of vector graphics can be particularly advantageous in a mobile map system in which image data is sent from a centralized map database via a communications network (such as the Internet, a wireless network, etc.) to one or more mobile or remote devices for display. In particular, vector data, once sent to the receiving device, may be more easily scaled and manipulated (e.g., rotated, etc.) than pixilated raster image data. However, the processing of vector data is typically much more time consuming and processor intensive on the image rendering system that receives the data. Moreover, using vector image data that provides a higher level of detail or information to be displayed in a map leads to a higher amount of vector data or vertices that need to be sent to the map rendering system from the map database that stores this information, which can result in higher bandwidth requirements or downloading time in some cases.

Moreover, in the case of both rasterized map images and vector data generated images, text or other legend symbols, such as those used to label streets, roads and other features of a map, are generally placed on or proximately near to a map object for which the label identifies or provides information. Generally, each time a zoom level of a computerized map is changed or adjusted, labels may be redrawn. The redrawing of labels during zooming may result in a visually distracting crawling motion or effect where the labels are perceived to move along a dimension of its associated map feature.

SUMMARY

A computer-implemented method for rendering a map on a display device determines a road feature to display in a viewing window having a first zoom level. The method determines an ordered set of labels to be displayed on the road feature and labels the road feature in the following manner. First, a segment of the road feature is determined for applying a label. Second, a subsequent label of the ordered set of labels is placed at the center of the determined road segment if the length of the road segment fits the length of the subsequent label. Third, a pair of resultant segments is determined if the subsequent label is placed. For each resultant segment produced, the first, second, and third steps are repeated until a stop condition is reached.

In one embodiment, an order in which each pair of resultant segments is placed is based on the label placed on a parent of the pair of resultant segments. When a parent segment of a pair of resultant segments is proximate the first endpoint of the road feature then a resultant segment that is proximate to the first endpoint of the road feature is to be labeled first with a subsequent label while the other resultant segment of the pair is to be labeled with a label subsequent the first label. When a parent segment of a pair of resultant segments is proximate the second endpoint of the road feature then a resultant segment that is proximate to the second endpoint of the road feature is to be labeled first while the other resultant segment of the pair is to be labeled with a label subsequent the first label. A stop condition may be reached when there exists no resultant segments that fit a corresponding sequential label.

According to another embodiment, a computer device includes a communications network interface, a processor, a memory coupled to the processor, a display device coupled to the processor and a number of routines stored in the memory that execute on the processor. A first routine receives a set of map data comprising data defining at least one road feature of a map and an ordered set of labels associated with the road feature. A second routine selects a zoom level, a viewing window position, and a viewing window size for rendering the map with the road feature on the display device. A third routine determines a segment of the road feature to apply a label. A fourth routine places a subsequent label from the ordered set of labels at the center of the determined segment if a length of the determined segment fits a length of the subsequent label. A fifth routine determines a pair of resultant segments produced by placing the label on the determined segment if a label is placed. A sixth routine repeats the third, fourth and fifth routine for each resultant segment produced until a stop condition is reached.

BRIEF DESCRIPTION OF THE DRAWINGS

FIGS. 3A-3G illustrate a technique for placing labels on a road feature according to an embodiment.

DETAILED DESCRIPTION

A graphics or image rendering system, such as a map image rendering system, receives image data from an image database in the form of vector data that defines various linear features of the map, such as roads, boundaries, etc., in addition to text strings or symbols to be displayed with the features to provide, for example, labels for the features. A label positioning technique generally divides the displayed linear feature into a number of segments and then labels each segment in a sequence based on an ordered set of labels and a position of each segment.

The label rendering technique positions the text string and/or symbol labels such that the labels are less likely to move along a dimension of the linear feature (e.g., a road feature) when a map zoom level is changed. Generally, the label movement during zooming is referred to as "crawling" and can be a distraction for map viewers. The image rendering system also provides a more consistent labeling process that enhances visual properties within a map image.

Figure 1:
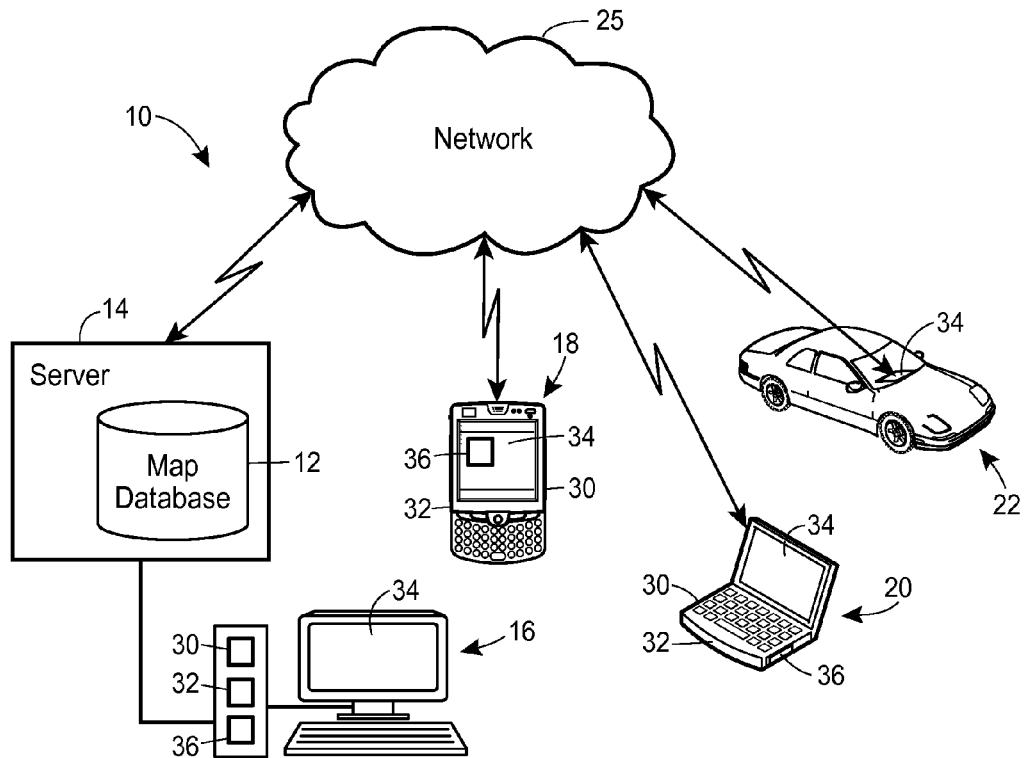
FIG. 1 is a high level block diagram of a map imaging system that implements communications between a map database stored in a server and one or more map image rendering devices.

Referring now to FIG. 1, a map-related imaging system 10 includes a map database 12 stored in a server 14 or in multiple server located at, for example, a central site or at various spaced apart sites, and also includes multiple map client devices 16, 18, 20, and 22, each of which stores and implements a map rendering device or a map rendering engine. The map client devices 16-22 may be connected to the server 14 via any hardwired or wireless communication network 25, including for example a hardwired or wireless LAN, MAN or WAN, the Internet, or any combination thereof. The map client devices 16-22 may be, for example, mobile phone devices (18), computers such a laptop, desktop or other types of computers (16, 20) or components of other imaging systems such as components of automobile navigation systems (22), etc. Moreover, the client devices 16-22 may be communicatively connected to the server 14 via any suitable communication system, such as any publically available or privately owned communication network, including those that use hardwired based communication structure, such as telephone and cable hardware, and/or wireless communication structure, such as wireless communication networks, including for example, wireless LANs and WANs, satellite and cellular phone communication systems, etc.

The map database 12 may store any desired types or kinds of map data including raster image map data and vector image map data. The image rendering systems described herein are highly suited for use with vector image data which defines or includes a series of vertices or vertex data points for each of numerous sets of image objects, elements or primitives within an image to be displayed. However, while the image rendering systems may primarily generate images based on vector image data, in some embodiments, a combination of vector image map data and raster image map data may be utilized. For example, for some zoom levels or when a slow client machine is performing image generation, raster backgrounds without any text (e.g., water, parks, roads, etc.) may be rendered with text generated from vector data. Generally speaking, each of the image objects defined by the vector data will have a plurality of vertices associated therewith and these vertices will be used to display a map related image object to a user via one or more of the client devices 16-22.

As will also be understood, each of the client devices 16-22 includes an image rendering engine having one or more processors 30, one or more memories 32, a display device 34, and in many cases a rasterizer or graphics card 36 which are generally programmed and interconnected in known manners to implement or to render graphics (images) on the associated display device 34. The display device 34 for any particular client device 16-22 may be any type of electronic display device such as a liquid crystal display (LCD), a light emitting diode (LED) display, a plasma display, a cathode ray tube (CRT) display, or any other type of known or suitable electronic display.

Generally, speaking, the map-related imaging system 10 of FIG. 1 operates such that a user, at one of the client devices 16-22, opens or executes a map application (not shown in FIG. 1) that operates to communicate with and to obtain map information or map related data from the map database 12 via the server 14, and that then displays or renders a map image based on the received map data. The map application may allow the user to view different geographical portions of the map data stored in the map database 12, to zoom in or zoom out on a particular geographical location, to rotate, spin or change the two-dimensional or three-dimensional viewing angle of the map being displayed, etc. More particularly, when rendering a map image on a display device or a display screen 34 using the system described below, each of the client devices 16-22 downloads map data in the form of vector data from the map database 12 and processes that vector data using one or more image shaders to render an image on the associated display device 34.

Figure 2:
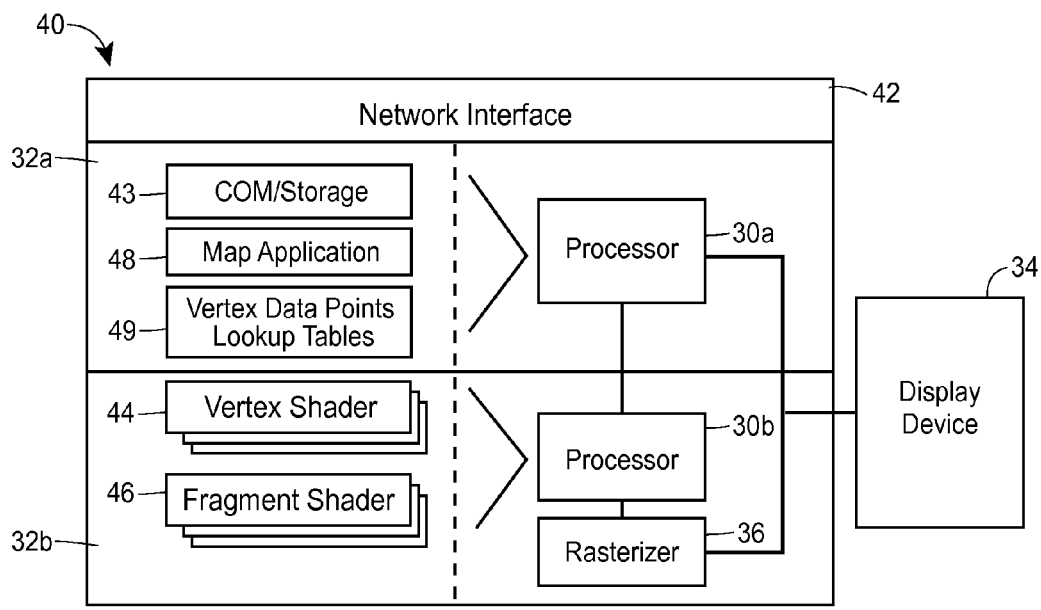
FIG. 2 is a high level block diagram of an image rendering engine used to render map images using map vector data.

Referring now to FIG. 2, an image generation or imaging rendering device 40 associated with or implemented by one of the client devices 16-22 is illustrated in more detail. The image rendering system 40 of FIG. 2 includes two processors 30a and 30b, two memories 32a and 32b, a user interface 34 and a rasterizer 36. In this case, the processor 30b, the memory 32b and the rasterizer 36 are disposed on a separate graphics card (denoted below the horizontal line), although this need not be the case in all embodiments. For example, in other embodiments, a single processor may be used instead. In addition, the image rendering system 40 includes a network interface 42, a communications and storage routine 43 and one or more map applications 48 having map display logic therein stored on the memory 32a, which may be executed on the processor 30a. Likewise one or more image shaders in the form of, for example, vertex shaders 44 and fragment shaders 46 are stored on the memory 32b and are executed on the processor 30b. The memories 32a and 32b may include either or both volatile and non-volatile memory and the routines and shaders are executed on the processors 30a and 30b to provide the functionality described below. The network interface 42 includes any well known software and/ or hardware components that operate to communicate with, for example, the server 14 of FIG. 1 via a hardwired or wireless communications network to obtain image data in the form of vector data for use in creating an image display on the user interface or display device 34. The image rendering device 40 also includes a data memory 49, which may be a buffer or volatile memory for example, that stores vector data received from the map database 12, the vector data including any number of vertex data points and one or more lookup tables as will be described in more detail.

During operation, the map logic of the map application 48 executes on the processor 30 to determine the particular image data needed for display to a user via the display device 34 using, for example, user input, GPS signals, prestored logic or programming, etc. The display or map logic of the application 48 interacts with the map database 12, using the communications routine 43, by communicating with the server 14 through the network interface 42 to obtain map data, preferably in the form of vector data or compressed vector data from the map database 12. This vector data is returned via the network interface 42 and may be decompressed and stored in the data memory 49 by the routine 43. In particular, the data downloaded from the map database 12 may be a compact, structured, or otherwise optimized version of the ultimate vector data to be used, and the map application 48 may operate to transform the downloaded vector data into specific vertex data points using the processor 30a. In one embodiment, the image data sent from the server 14 includes vector data generally defining data for each of a set of vertices associated with a number of different image elements or image objects to be displayed on the screen 34 and possibly one or more lookup tables. If desired, the lookup tables may be sent in, or may be decoded to be in, or may be generated by the map application 48 to be in the form of vector texture maps which are known types of data files typically defining a particular texture or color field (pixel values) to be displayed as part of an image created using vector graphics. More particularly, the vector data for each image element or image object may include multiple vertices associated with one or more triangles making up the particular element or object of an image. Each such triangle includes three vertices (defined by vertex data points) and each vertex data point has vertex data associated therewith. In one embodiment, each vertex data point includes vertex location data defining a two-dimensional or a three-dimensional position or location of the vertex in a reference or virtual space, as well as an attribute reference. Each vertex data point may additionally include other information, such as an object type identifier that identifies the type of image object with which the vertex data point is associated. The attribute reference, referred to herein as a style reference or as a feature reference, references or points to a location or a set of locations in one or more of the lookup tables downloaded and stored in the data memory 43.

Existing map rendering systems may receive map data from a database in the form of vector data or image data and render a map surface including a set of map features on a display based on the vector data or image data. The map rendering systems may label one or more of the map features with text or image labels (e.g., icons) that identify the map features. When a zoom level of a displayed map is changed, the map features may be re-labeled. Existing systems may re-label linear map features (such as roads, boundaries, etc.) in a manner that produces a crawling effect of the labels, where the labels appear to move along a dimension of the linear map feature. This can be highly distracting to map viewers. The labeling technique described herein may be used to reduce the crawling effect of labels during zoom level changes. Generally, the labeling technique for rendering a label along a map object involves iteratively bisecting a road section using labels of an ordered set of labels. A label may be placed in a sequence on the resultant segments of the bisections based and an ordered set of labels and a bisection order. The bisection labeling process may be repeated each time a zoom level is changed.

FIGS. 3A-3G illustrate a labeling technique for placing labels on a road feature according to an embodiment. In the example of FIGS. 3A-3G, a label set may include a primary label or icon I, and auxiliary labels Ta and Tb. The label set may be ordered so that the primary label I is first in the order. In this example of an ordered set of labels, I is first, Ta is second, and Tb is third. Further, in this example, Ta has a width of 30 pixels wide, Tb has a width of 70 pixels, and I has a width of 20 pixels. However, the labels could be any other size or dimension and labels within the set of labels may include more or less than three labels.

Figure 3A:
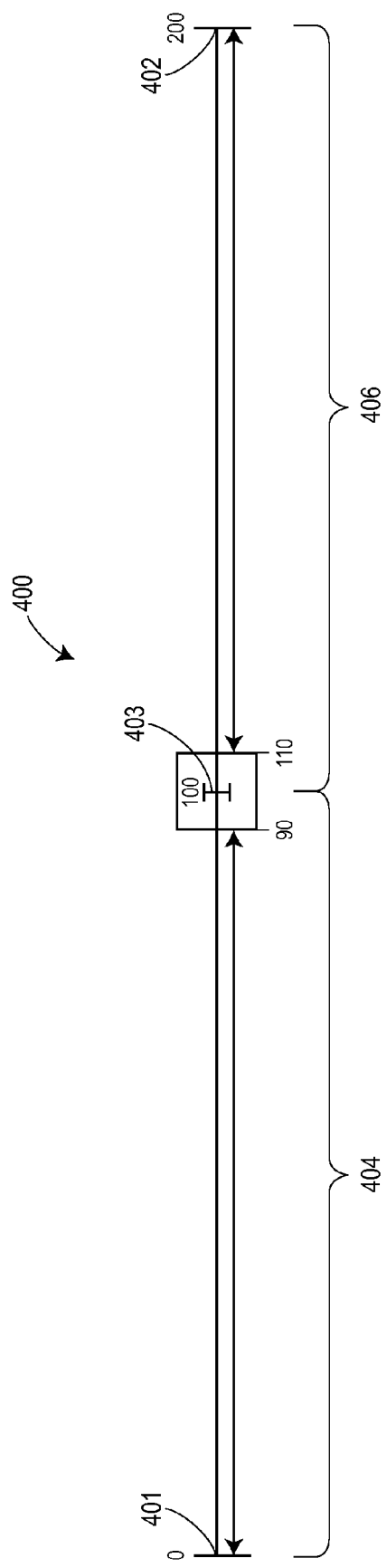

FIG. 3A illustrates a straight road feature 400 that may be displayed within a viewing window (not shown). Generally, a viewing window may be defined by a zoom level, a viewing window position, and a viewing window size for rendering the map with the road feature 400 on the display device. A zoom level may correspond with a magnification level. FIG. 3A illustrates that the road feature 400 has a first endpoint 401 and a second endpoint 402 and a length of 200 pixels on the display screen. It should be noted that the road feature 400 may be completely shown in a single viewing window or road feature 400 may represent only a section of a larger feature that is not displayed or cannot be displayed on the viewing window. A check may be made to determine whether the road feature 400 is long enough to accommodate or fit a corresponding label. In this case, 200 pixels is enough to accommodate the first label, I, which is 20 pixels wide. A midpoint 403 of the road feature may then be determined by, for example, dividing the length of the road feature in half. Accordingly, in FIG. 3A, a midpoint of the road feature 400 may be calculated to be at 100 pixels from either endpoint 401, 402 along the center line. A length of 10 pixels (half the length of the label I) on each side of the center point (totaling a width of 20 pixels) may then be reserved for the primary label I. A pair of resultant road segments 404 and 406 are produced from this bisection with resultant road segment 404 being located at 0-90 pixels and resultant road segment 406 being located at 110-200 pixels. The resultant road segments 404, 406 may generally be produced by bisecting the road feature 400 to produce two equal length resultant segments and subtracting a portion of the length of the label from the resultant road segments. In this particular case, equal portions of the length of the label are subtracted from each of the resultant road segments so that the resultant road segments 404, 406 remain equal in length. This may be the case when a center of the label is also centered at the midpoint 403 of the road feature (or road segment) being bisected.

The two road segments 404, 406 that result from the bisection may then be labeled at their centers using subsequent labels in the sequence of the ordered set of labels and so on. Generally, each subsequent road segment that is processed may be labeled with the next label in the ordered set. In particular, at this stage of the bisection process, a selection may be made to start with either road segment 404 or road segment 406. Because of the orientation of the road segments within the viewing window, road segment 404 may be referred to herein as a left branch segment (at range 0-90 pixels) that is proximate the first endpoint 401 of road feature 400 and road segment 406 may be referred to herein as a right branch segment (at range 110-200 pixels) that is proximate second endpoint 402. A default process may select the left branch segment. In this case, the left branch segment 404 may be labeled with the subsequent label of the set Ta and right branch segment 406 may be labeled with the subsequent label Tb. Generally, when the end of the ordered set of labels is reached (e.g., selected or placed) the order may start again from the beginning of the ordered set of labels. Thus, because label Tb has been selected for the right branch segment 406, a subsequent label in the ordered set of labels may start over with the label I.

Figure 3B:
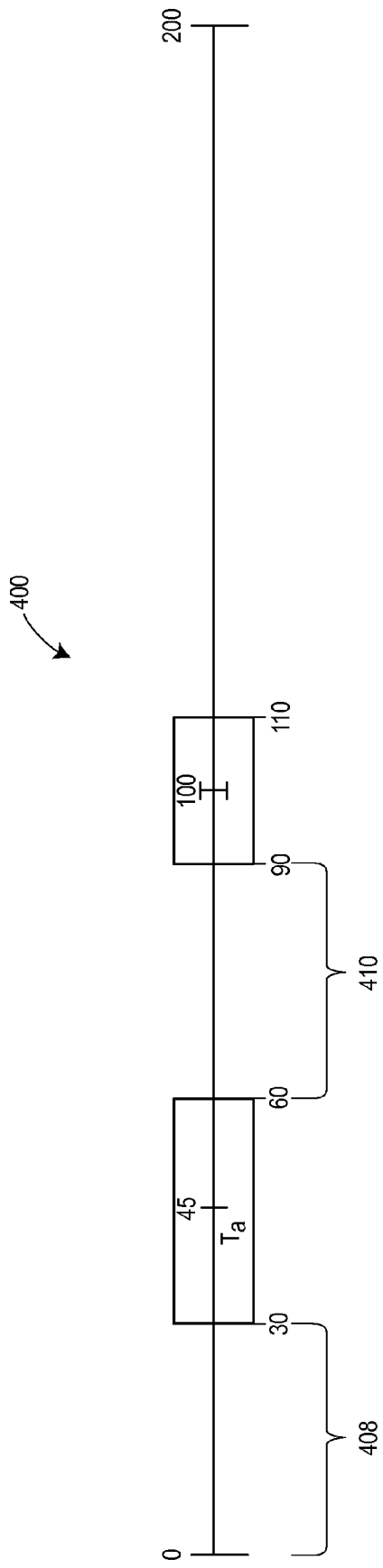

FIG. 3B illustrates a process of labeling the left branch segment 404 with label Ta. The center of the segment 0-90 may be determined to be at pixel 45. The label Ta is 30 pixels wide and the left branch segment 404 is 90 pixels wide, and thus, the label Ta fits. A length of a range 30-60 pixels may then be reserved for the label Ta. After reserving the space for the label Ta, two segments 408 and 410 at ranges 0-30 and 60-90, respectively, remain. Generally, a segment may be referred to as a parent segment when it is bisected to produce a pair of resultant or child segments. An order of labeling a pair of resultant segments may be based on the parent segment of the pair, wherein a proximity of the parent segment to an endpoint of the road feature 400 may determine which of the pair of resultant child segments may be labeled first with the next label of the ordered set. In one embodiment, a parent segment that is proximate a first endpoint may determine that a corresponding resultant segment that is also proximate the first endpoint will be labeled next and vice versa. In the example of FIG. 3B, the left segment 408 may be labeled first with the label Tb which is the next label in the ordered set of labels after the parent label Ta of the parent segment 404. The right segment 410 may be labeled with a label subsequent Tb, which is I (since the ordered set repeats when the end of the set is reached).

Figure 3E:
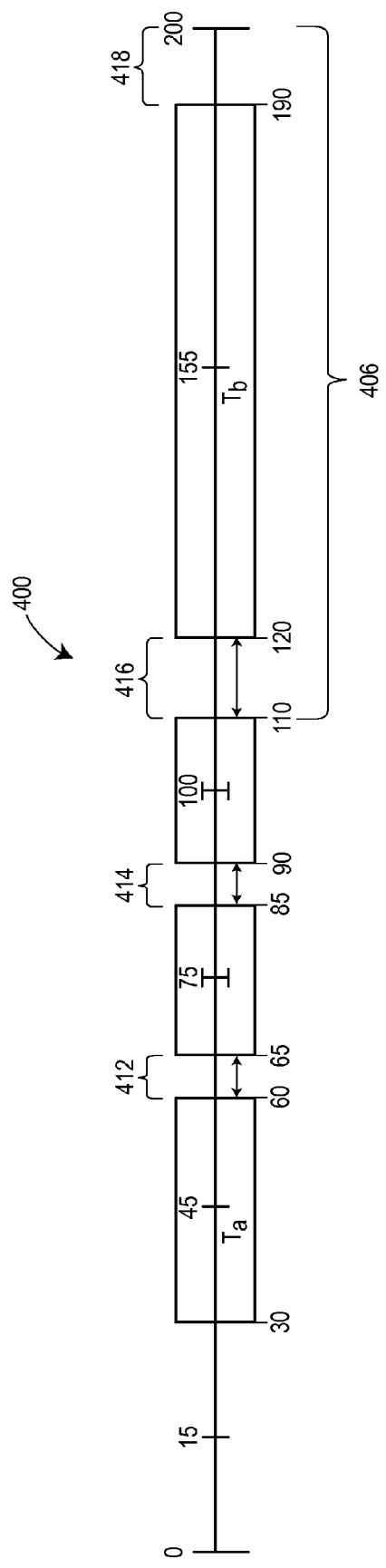

FIG. 3C illustrates an approach to labeling the segment 408. A center or midpoint of segment 0-30 is at pixel 15. The label Tb is 70 pixels wide while the segment 408 is only 30 pixels wide. Because the label Tb does not fit, the label Tb may not be placed and the processing of segment 408 ends. FIG. 3D illustrates an approach to labeling the segment 410 (at range 60-90) with the next label in the ordered set of labels, Icon I (as the set of labels repeat). The center of segment 410 (at range 60-90) is determined to be at pixel 75. The Icon I is 20 pixels wide and the segment is 30, and thus, the label I fits and is placed along the segment at the center point at pixel 75. Pixels 65-85 may be reserved for Icon I (which is 20 pixels wide). Two segments 412 and 414, at ranges 60-65 and 85-90 pixels, respectively, remain. Because this pair of resultant segments 412, 414 have a parent segment 410 that is a right segment (being proximate to endpoint 200), the right child segment 412 (at range 85-90) may be processed first with the next label of the ordered set of labels, Ta, and the left segment 412 (at range 60-65) may be labeled with a subsequent label of the ordered set of labels, Tb. The right segment 414 (at range 85-90) is 5 pixels wide for a 30 pixel wide label, so the label Ta will not fit and processing of this branch ends. The left segment 412 (at range 60-65) is 5 pixels wide for a 70 pixel wide label, so the label Tb will not fit and processing of this branch ends. Because there are no more segments to process from the left branch segment (at range 0-90) of the road feature 400, the right branch segment 406 (at range 110-200) of the road feature 400 may be processed with the label Tb, as illustrated in FIG. 3E. A center of the segment 110-200 is determined to be at pixel 155. The label Tb is 70 pixels wide and the segment 406 is 90 pixels wide, and thus, the label Tb fits. A length of 70 pixels at range 120-190 pixels may be reserved for Tb. Two resultant road segments, 416 and 418 having ranges 110-120 and 190-200, respectively, remain. Because the resultant road segments 416, 418 were produced from a right road segment parent 406, the right road segment child 416 (at range 190-200) of the remaining road segments may be labeled first so that the resultant road segment (at range 190-200) 418 will be labeled with the subsequent label, I, and the resultant road segment (at range 110-120) 416 will be labeled with the label after, Ta. The road segment 418 (at range 190-200) is 10 pixels wide for a 20 pixel wide label, so processing for this road segment ends. The resultant road segment 416 (at range 110-120) has a width of 10 pixels for a 30 pixel wide label, so processing of this segment ends. Because there are no remaining road segments for processing, FIG. 3E illustrates the labeling results with the label Ta segment 30-60, the label I at segment 65-85, the label I at segment 90-110, and the label Tb at segment 120-190.

Figure 3F:
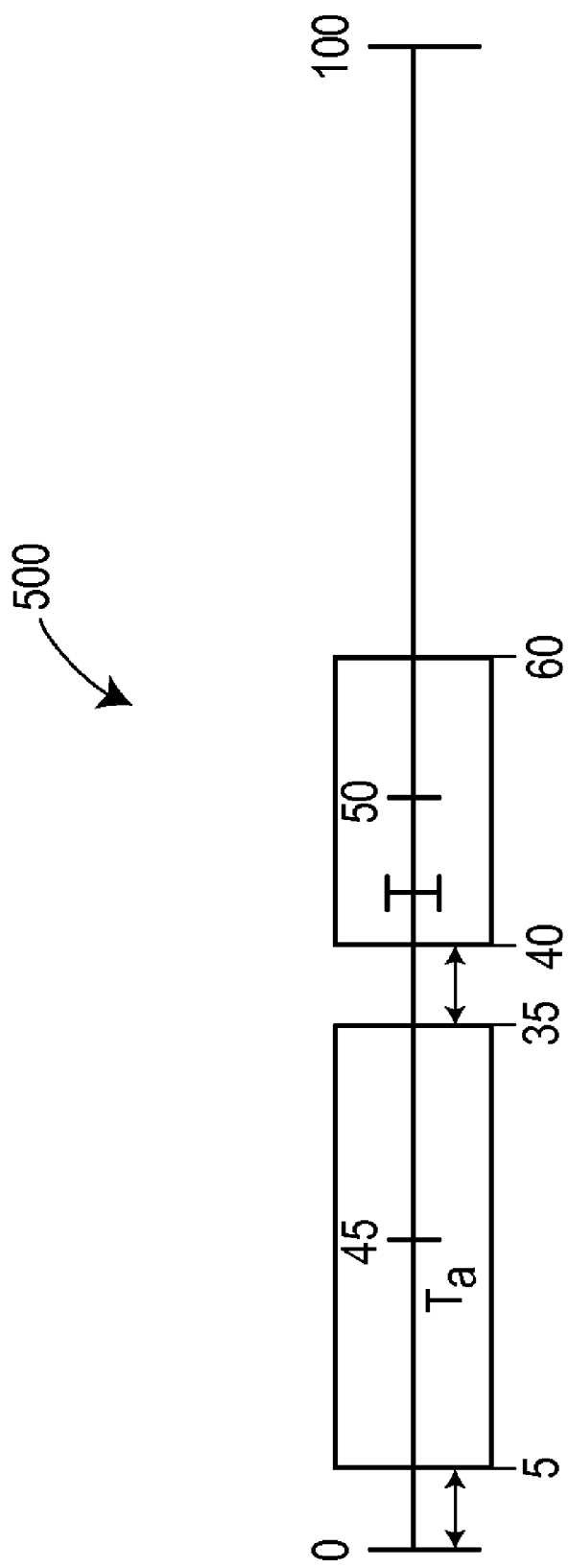
Figure 3G:
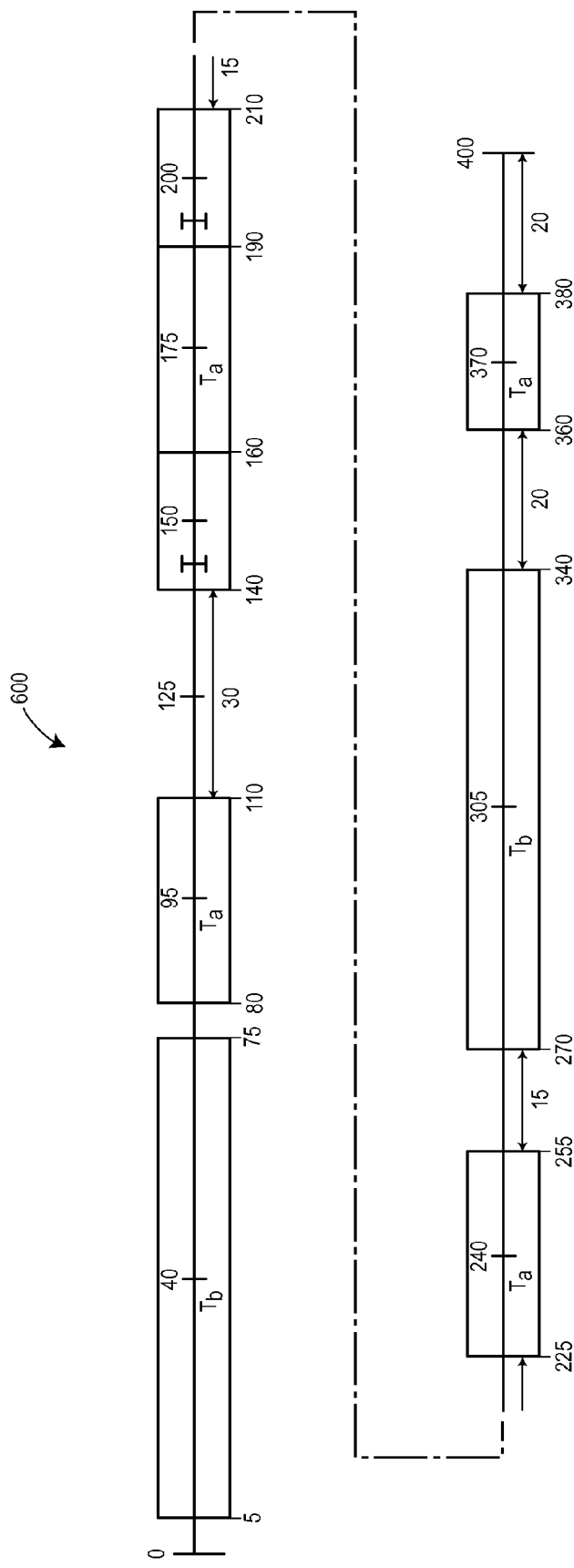

FIG. 3F illustrates the same process, technique, or algorithm of FIGS. 3A-3E applied to a road feature that is 100 pixels long and FIG. 3G illustrates the same process, technique, or algorithm of FIGS. 3A-3E applied to a road feature that is 400 pixels long. In the 100 pixel case of FIG. 3F, only two labels fit: the label Ta for segment 5-35 and the label I for segment 40-60. The placement of the labels Ta and I are in the same relative place: the label I in the center, the label Ta left of center. There is no space for the label Tb or the second Icon label I for the 100 pixel road feature. In the 400 pixel case of FIG. 3G, the same labels of FIG. 3E are placed but with more labels between them. A possible advantage of this labeling technique is that the Ta, I, and Tb labels may be placed in roughly the same relative locations on the road or at least may visually appear so. The process of labeling may be performed each time a zoom level is changed to reduce the crawling motion or effect that may happen to a greater extent otherwise.

Figure 4A:
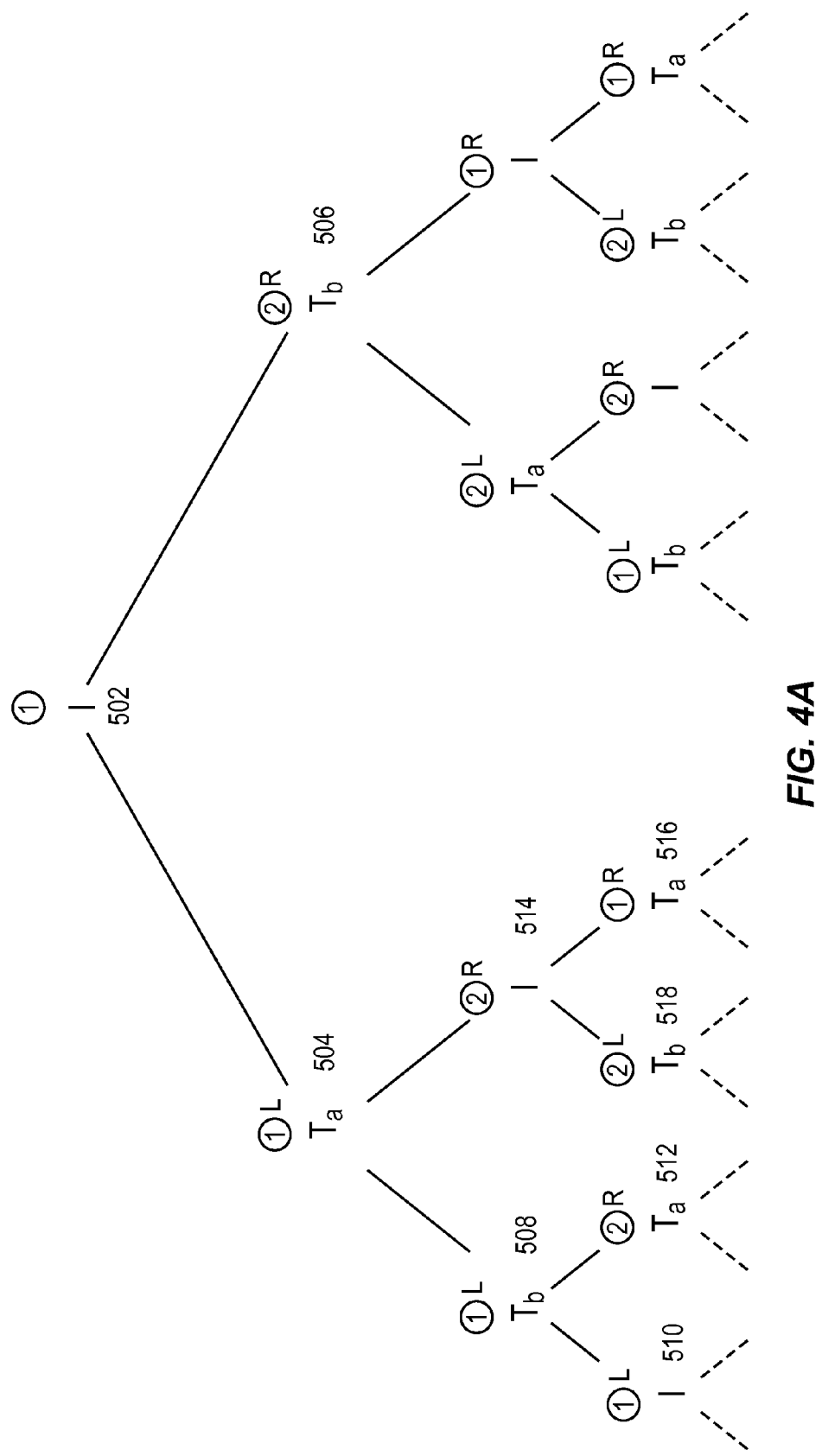
FIGS. 4A-4B illustrate a label sequencing approach.

FIG. 4A illustrates a diagram for determining the sequencing of the labels during the labeling technique described above. The road section that is displayed on a viewing window of a map application may be labeled with a first primary label. Using the same ordered set of labels as for FIGS. 3A-3G (i.e., the ordered set of labels I, Ta, and Tb), the first label for the first main segment is I. At a first division or bisection 502, the process or technique may select a left branch 504 (e.g., proximate a first endpoint) or a right branch (e.g., proximate a second endpoint) 506, where the branches correspond to road segments and/or bisections. The example of FIGS. 3A-3G used a left branch approach and this left approach is illustrated in FIG. 4A. The numbers 1 and 2 at each branch pair level of FIG. 4A indicate the order of labeling for that branch. Generally, each of a pair of resultant road segments that is produced by bisecting the road feature or a road segment of the road feature is either proximate the first or the second endpoint of the road feature. In the diagram of FIG. 4A, left branches may correspond with proximity to the first endpoint while right branches may correspond with proximity to the second endpoint. For example, at bisection 502, the road segment corresponding with branch 504 may be proximate the first endpoint (e.g., a left endpoint) with respect to the road segment corresponding with branch 506, while the road segment corresponding with branch 506 may be proximate the second endpoint (e.g., a right endpoint) with respect to road segment corresponding with branch 504. An order of labeling each of the resultant pair of road segments is based, in part, on a proximity to the first or second endpoint (or left or right endpoint) of the parent road segment that produced the resultant pair of child road segments. In an embodiment, when the parent segment of a pair of resultant child road segments is proximate a first endpoint (left endpoint), then the resultant child road segment that is proximate the first endpoint (left endpoint) will be labeled first. Accordingly, when the parent segment of a pair of resultant child segments is proximate a second endpoint (right endpoint), then the resultant child segment that is proximate the second endpoint (right endpoint) will be labeled first. Thus, for example, at a bisection 508 that corresponds with a left parent branch or left parent road segment, the left child branch segment 510 is labeled first and the right child branch segment 512 is labeled second.

An order of labeling each of the resultant pair of road segments is also based on the label of the parent road segment that produced the pair of child road segments. The first child road segment of the pair of child road segments to be labeled may be labeled with the next label of the ordered set of labels after the parent label. The second child road segment of the pair of child road segments may be labeled with the next label of the ordered set of labels after the first child road segment. For example, the road segment corresponding with the left branch 510 may be labeled with the Ta, which is the subsequent label of the ordered set following the parent label I, while the road segment corresponding with right branch 512 may be labeled with a label subsequent the left branch road segment, which is Tb.

Figure 4B:
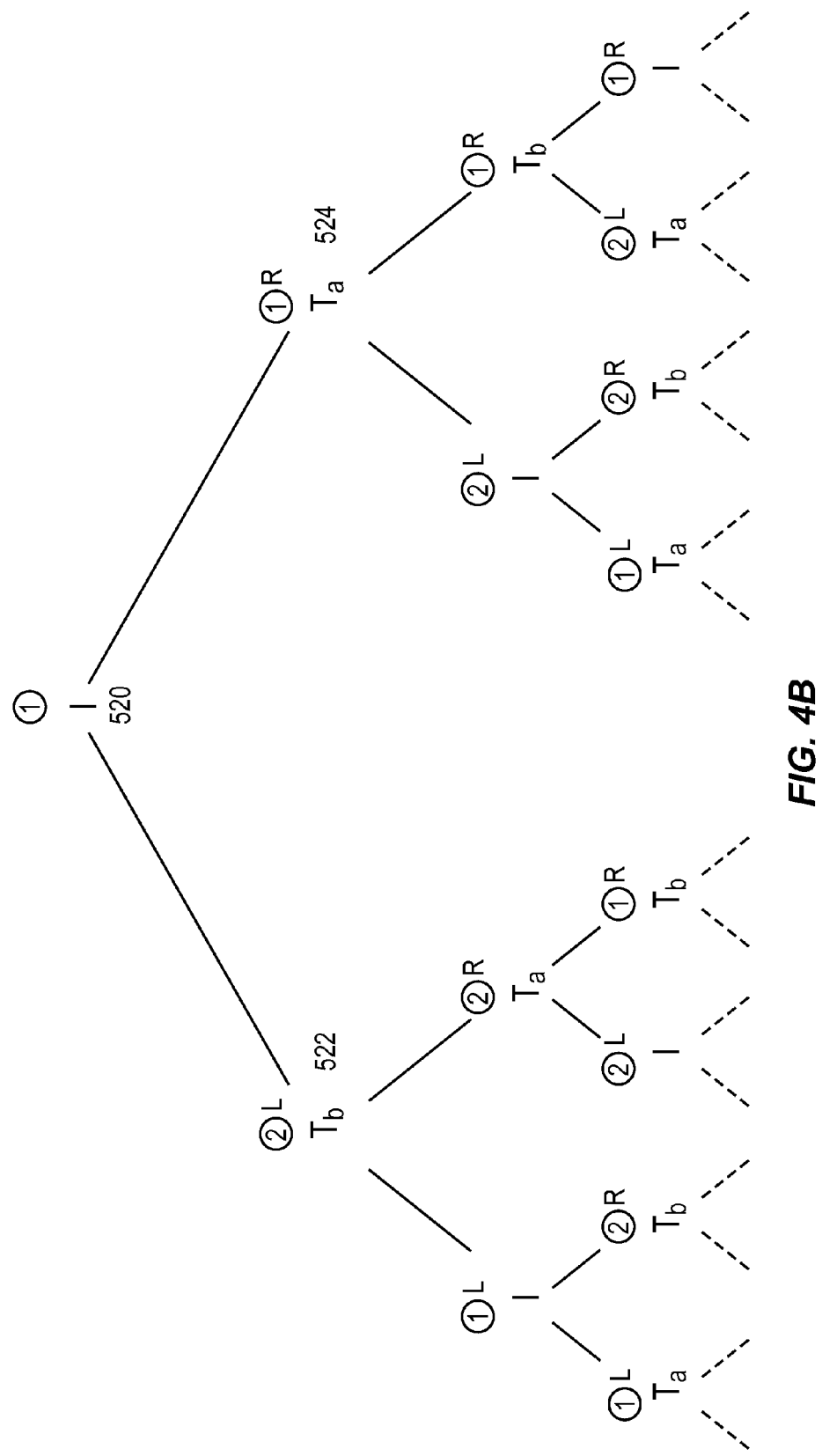

FIG. 4B illustrates a similar sequencing diagram as FIG. 4A except that during the first bisection 520, a right branch 524 is selected first for labeling followed by a left branch 522. Generally, the same rules apply as for sequencing of FIG. 4B. In other words, the order in which the a pair of resultant segments is labeled is based on the parent segment that produced the pair, based on the above described rules.

Figure 5:
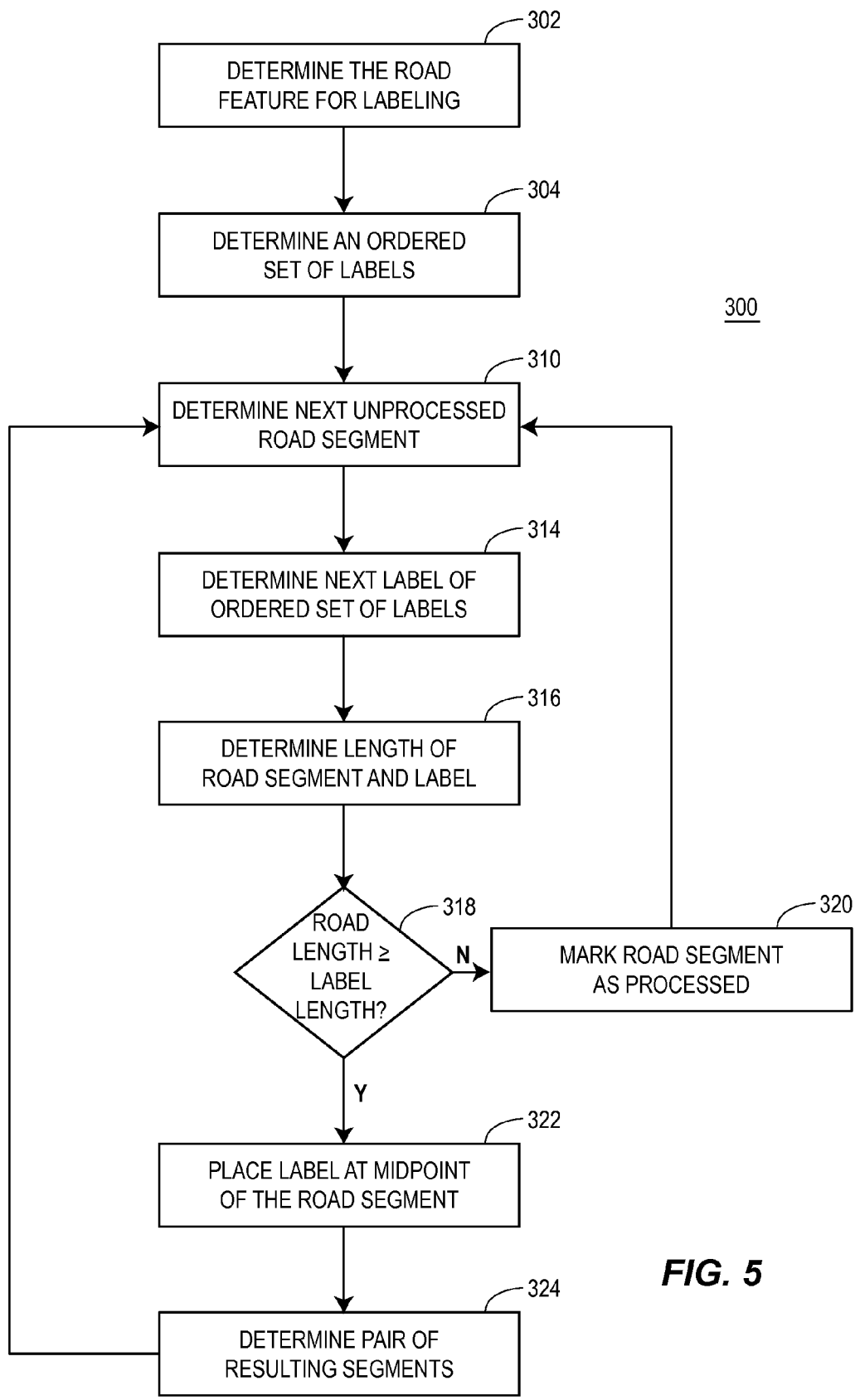
FIG. 5 illustrates a process diagram of the labeling technique.

FIG. 5 illustrates a process flow diagram or flow chart of a method, routine, or process 300 that may be used to render labels on a road feature of a map. As an example only, the routine 300 may be used in a map rendering engine, such as that of FIG. 2, to render a label on or about the map feature in a manner that reduces crawl, creep, or drift. Generally, speaking, the routine or process 300 may be implemented as one or more software routines or applications, including routines that are part of the map application 48. These routines may be implemented or written in any desired language, such as Javascript, C code, etc. and may be executed on the processor 30. Additionally, these routines may use the rasterizer 36 to render an image on the display device 34.

A block 302 may determine a linear map feature to be displayed on a viewing window. The linear map feature may be a road, street, boundary, river segment, etc. The viewing window may be defined by a particular zoom level, wherein the zoom level corresponds to a magnification level of a map portion being displayed. Generally, for a constant viewing window size, as zoom level increases, map area decreases. It should be noted that in some embodiments, changing zoom level may correspond to redrawing a map area with greater or lesser map data or detail, where the map data used in a prior zoom level is different than that for the redrawn level. A zoom level change where additional data (e.g., vector data) is used to redraw a map may be different from a zoom level change where only a scale of the map area is changed (e.g., same level of detail but greater magnification). It should be noted that in some embodiments, each time a zoom level is changed and/or a viewing window position is changed, the existing labels may be removed and the labeling technique described herein repeated.

The entirety of a linear map feature may not always be displayed entirely within a viewing window. Instead, only a portion less than the entire feature may be shown. In this case, the viewable portion of the linear feature may be limited by a size and a position of the viewing window and the zoom level.

In some computer mapping applications, the position of the viewing window, the size of the viewing window, and/or the zoom level may be changed to reveal some or all of the road feature, depending on the total length or size of street. In one embodiment, a larger portion of a road feature may be processed using the described labeling technique even though the entire road feature is not displayed in a current viewing window. In this case, labels on portions of the road that are not visible are not displayed until or unless the viewing window is changed to show those portions. While the process of FIG. 5 may be applied to any linear map feature, the blocks of FIG. 5 may be discussed with respect to a road feature.

A block 304 may determine an ordered set of labels for labeling the road feature. The set of labels may be text describing the road feature. Alternatively, the set of labels may include images representing, for example, icons. The set of labels may be generally ordered by a priority of each label. In one embodiment, the first label in the sequence may be the highest priority label, with subsequent labels having less priority. In one embodiment, a first label may be a primary label that may be most frequently applied or placed on a road. Ancillary second, third, etc. labels may have less placement frequency. The ordered set of labels may be determined by a mapping application or retrieved from a table.

At block 310, a road segment of the road feature may be selected for labeling. In a first iteration of this process, an entire displayed road section may be selected in block 310. A block 314 determines or selects a next label of the ordered set of labels. In a first iteration of the method of FIG. 3, the selected label may represent a first, primary label.

At block 316, a length of the road segment along its center line may be determined along with a length of the selected label. A block 318 may determine whether the length of the road segment is long enough to accommodate the length of the label. If, at block 318, the segment is not long enough for the determined label, the segment may be discarded or marked as being processed at block 320. The process may then continue back at block 310 for another unprocessed road segment. The block 310 may search for road segments that are not marked processed. If the length of the road segment at block 318 is long enough to accommodate the length of the label, block 322 may place the selected label at the center of the road segment. A block 322 may determine where to place the selected label by dividing the length of the road segment in half (e.g., bisecting the road) and placing the selected label at the bisection or midpoint. A block 324 may determine a pair of resultant segments produced by bisecting the determined road segment. The block 324 may reserve a length of space about the midpoint of the road segment for the label so that the resultant segments do not include the length of the label. This may be performed by subtracting half the length of the label from each of the two segments produced from a bisection of the determined road segment. The resultant segments may represent additional unprocessed segments.

The blocks 304 and/or 310 may include determining an order of the label processing or segmentation such that the labels are placed on the road segments according to the order illustrated in FIG. 4A or 4B. The process of FIG. 3 continues from the block 324 to the block 310 where a next unprocessed road segment may be determined for processing. The process of FIG. 3 may be repeated for every remaining unprocessed segment until a stop condition is reached. In one embodiment, a stop condition may be reached when no remaining segments can fit a corresponding label from the ordered label set. When this labeling process is performed, the overall placement of the labels may be visually perceived to be similar at two or more different zoom levels. Another stop condition may be reached when the number of bisections executed is above a threshold number of bisections. This threshold number may be a fixed number or may be adjusted based on a total length of a road feature that is displayable within a viewing window. In some embodiments, stop conditions may be based on characteristics of the label set. For example, the label set may not be a fixed set, where certain labels may have a fixed number of uses. In the currently described label set, for example, the icon label may only be used a single time before the icon label is removed from the label set. In this embodiment, a stop condition may be encountered when there are no remaining labels in the set.

Figure 6A:
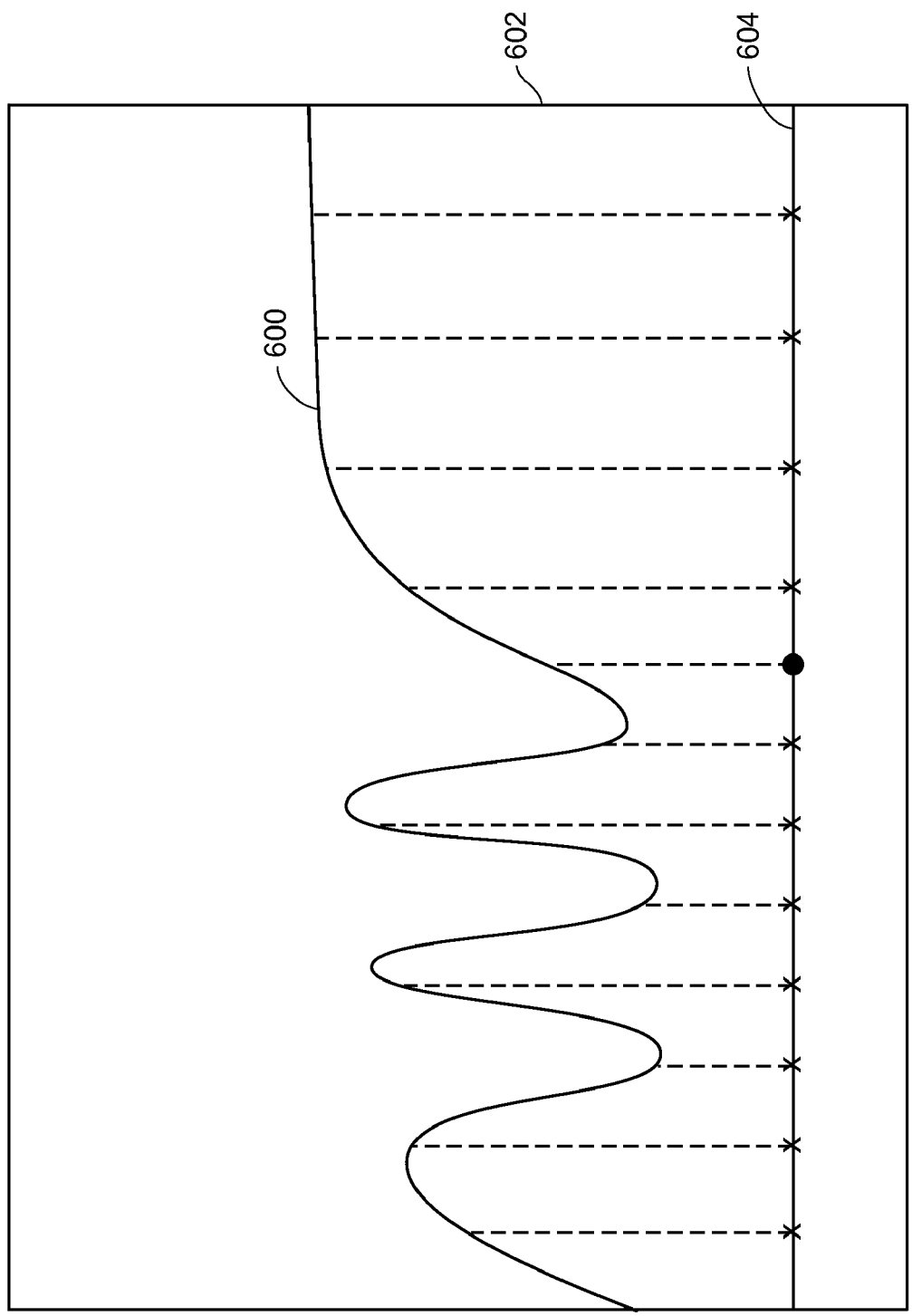
FIGS. 6A and 6B illustrate determining a length of a road section by projection on a center line.
Figure 6B:
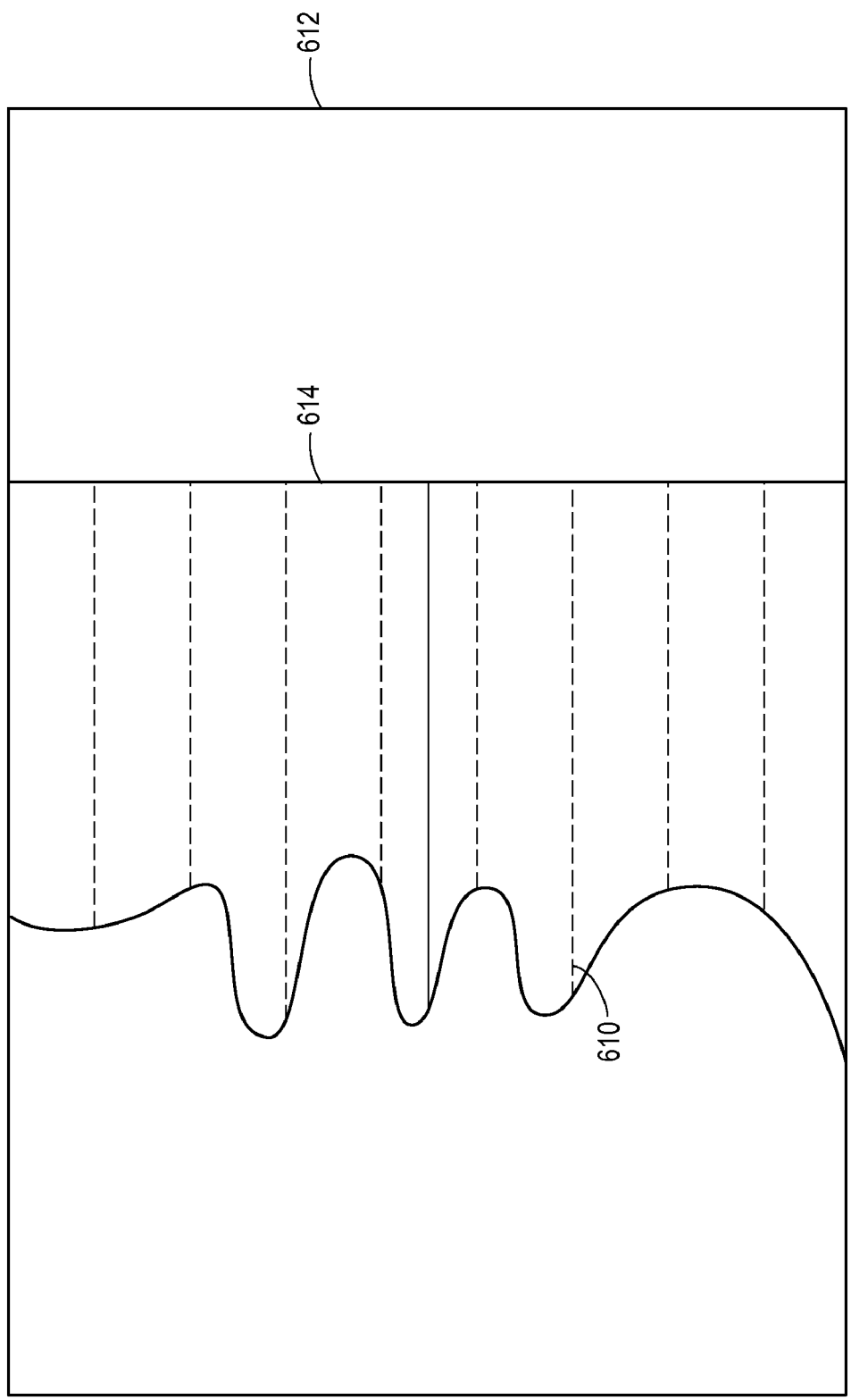

FIG. 6A illustrates a curved road 600 within a viewing window 602. In one embodiment, the length of the road 600 may be calculated or determined at block 316 based on a flattened projection on a centerline 604. In this case, the road is flattened along a horizontal center line 604. Generally, points along the road 600 may be represented as a distance on the straight line 604, thereby eliminating a vertical length component of the road. Flattening the road may be advantageous in situations when the road includes a plurality of turns and windings that may tend to visually distort or compress road labels if the actual length of the road (e.g., the length along a road curve) is used for length determinations. FIG. 6B illustrates a curved road 610 within a viewing window 612 that is projected along a vertical centerline 614. A choice of vertical or horizontal lines for flattening may be based on the shape and orientation of the road within the viewing window.

Of course, the labeling encoding techniques described herein may be altered or varied in any number of manners to provide an image rendering system, such as a map rendering system, with the ability to render individual text characters within a text string along a curved, e.g., multi-segmented line. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 25 may include but is not limited to any combination of a LAN, a MAN, a WAN, a mobile, a wired or wireless network, a private network, or a virtual private network. Moreover, while only four client devices are illustrated in FIG. 1 to simplify and clarify the description, it is understood that any number of client computers or display devices are supported and can be in communication with the server 14.

Additionally, certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map rendering system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for rendering map or other types of images using the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for rendering a map on a display device comprising:
   determining, using a computer device, a road feature to be displayed on a viewing window at a first zoom level, the road feature having a first and a second endpoint;
   determining, using the computer device, an ordered set of labels to be displayed with respect to the road feature;
   labeling, using the computer device, the road feature by:
   1) determining a segment of the road feature to apply a label, the segment having a length;
   2) placing a next label from the ordered set of labels at the center of the determined segment if a length of the next label is less than the length of the determined segment;
   3) determining a pair of resultant segments produced by placing the label on the determined segment on which the label is placed with a first one of the pair of resultant segments being on one side of the label along the determined segment and a second one of the pair of resultant segments being on the opposite side of the label with respect to the one side of the label along the determined segment; and
   for each resultant segment produced, repeating steps 1, 2, and 3 until a stop condition is reached.

2. The computer-implemented method of claim 1, wherein determining, using the computer device, the segment of the road feature to apply the label includes determining which resultant segment of each pair of resultant segments is to be labeled with a first label of the ordered set subsequent to a label of a parent segment that produced the resultant segment pair and determining which resultant segment of the pair of resultant segments is to be labeled with a second label subsequent to the first label of the ordered set.

3. The computer-implemented method of claim 2, further including determining, using the computer device, that a resultant segment of a pair of resultant segments that is proximate to the first endpoint of the road feature is to be labeled first with the next label when the parent segment is proximate the first endpoint while the other resultant segment of the pair of resultant segments that is distal to the first endpoint is to be labeled with a label subsequent the first label.

4. The computer-implemented method of claim 2, further including determining, using the computer device, that a resultant segment of a pair of resultant segments that is proximate to the second endpoint of the road feature is to be labeled first with the next label when the parent segment is proximate the second endpoint while the other resultant segment of the pair that is distal to the second endpoint is to be labeled with the next label subsequent the first label.

5. The computer-implemented method of claim 1, further including marking, using the computer device, a resultant segment that does not fit a corresponding next label as processed and wherein determining a segment of the road feature to apply a label includes determining whether a segment is marked as processed.

6. The computer-implemented method of claim 1, further including adjusting, using the computer device, the zoom level from the first zoom level to a second different zoom level and repeating steps 1, 2, and 3 for the road feature at the second zoom level.

7. The computer-implemented method of claim 1, wherein placing the next label from the ordered set of labels includes repeating the order of the labels after a last label of the ordered set has been selected as the next label.

8. The computer-implemented method of claim 1, wherein a stop condition is reached when no resultant segment exists whose size is greater than or equal to that of a corresponding sequential label.

9. The computer-implemented method of claim 1, wherein the ordered set of labels are ordered by a priority of each label.

10. The computer-implemented method of claim 1, further including determining, using the computer device, a length of the road feature, being a curved road feature, by calculating the length of the road feature along a center line of the road feature.

11. The computer-implemented method of claim 10, wherein the center line is one of a horizontal line or a vertical line of the viewing window.

12. The computer-implemented method of claim 1, wherein placing the next label from the ordered set of labels at the center of the determined segment includes aligning a center of the next label with the center of the determined segment.

13. The computer-implemented method of claim 12, wherein determining the pair of resultant segments produced by placing the label on the determined segment includes bisecting the determined segment and subtracting half a length of the placed label from each of the segments resulting from the bisection to produce the pair of resultant segments.

14. The computer-implemented method of claim 1, wherein placing the next label includes displaying the next label lengthwise along the road feature.

15. A computing device, comprising:
- a communications network interface;
- a processor;
- a memory coupled to the processor;
- a display device coupled to the processor;
- a first routine, stored in the memory, that executes on the processor to receive, via the communications network interface, a set of map data comprising data defining at least one road feature of a map and an ordered set of labels associated with the road feature;
- a second routine, stored in the memory, that executes on the processor to select a zoom level, a viewing window position, and a viewing window size for rendering the map with the road feature on the display device;
- a third routine, stored in the memory, that executes on the processor to determine a segment of the road feature to apply a label, the segment having a length;
- a fourth routine, stored in the memory, that executes on the processor to place a next label from the ordered set of labels at the center of the determined segment if a length of the next label is less than the length of the determined segment;
- a fifth routine, stored in the memory, that executes on the processor to determine a pair of resultant segments produced by placing the label on the determined segment on which the label is placed with a first one of the pair of resultant segments being on one side of the label along the determined segment and a second one of the pair of resultant segments being on the opposite side of the label with respect to the one side of the label along the determined segment; and
- a sixth routine, stored in the memory, that executes on the processor to repeat the third, fourth and fifth routine for each resultant segment produced until a stop condition is reached.

16. The computing device of claim 15, further including a seventh routine, stored in the memory, that executes on the processor to determine that a resultant segment of each pair of resultant segments that is proximate to the first endpoint of the road feature is to be labeled first with the next label when the parent segment is proximate to the first endpoint while the other resultant segment of the pair of resultant segments that is distal the second endpoint is to be labeled with a label subsequent the first label.

17. The computing device of claim 15, further including a seventh routine, stored in the memory, that executes on the processor to determine that a resultant segment of each pair of resultant segments that is proximate to the second endpoint of the road feature is to be labeled first with the next label when the parent segment is proximate to the second endpoint while the other resultant segment of the pair of resultant segments that is distal the second endpoint is to be labeled with a label subsequent the first label.

18. The computing device of claim 15, wherein the sixth routine reaches a stop condition when no resultant segment exists that fits a corresponding sequential label.

19. The computing device of claim 15, further including a seventh routine, stored in the memory, that executes on the processor to determine the length of the road feature by calculating a length of the road feature along a straight center line of the road feature.

20. The computing device of claim 15, further including a seventh routine, stored in the memory, that executes on the processor to adjust the zoom level from the first zoom level to a second different zoom level and to repeat the third, fourth, fifth and sixth routine for the road feature at the second zoom level.

21. A computer-implemented method for rendering a map on a display device comprising:
- displaying, using a computer device, a road feature to be displayed on a viewing window at a first zoom level, the road feature having a first and a second endpoint;
- displaying, using the computer device, an ordered set of labels on the road feature by:
  1) displaying a first label of the ordered set of labels centered at a midpoint of the displayed road feature, thereby creating a first and a second road segment on opposite sides of the first label that do not include the length of the first label;
  2) displaying a second label of the ordered set of labels subsequent the first label centered at the midpoint of the first road segment;
  3) displaying a third label of the ordered set of labels subsequent the second label centered at the midpoint of the second road segment, wherein displaying the second and the third label create additional pairs of resultant segments;
  4) for each resultant segment produced, displaying a next label from the ordered set of labels at the center of the resultant segment if a length of the next label is less than a length of the resultant segment.

22. The computer-implemented method of claim 21, wherein the set of labels are in a sequence of the first label, the second label, and then the third label, and wherein the first label is of a higher priority than the second and the third label.

23. The computer-implemented method of claim 22, further including determining that a resultant segment of a pair of resultant segments that is proximate to the first endpoint of the road feature is to be labeled first with the next label when a parent segment that produced the pair of resultant segments is proximate the first endpoint while the other resultant segment of the pair of resultant segments that is distal to the first endpoint is to be labeled with a label subsequent the label of the proximate resultant segment.

24. The computer-implemented method of claim 22, further including determining that a resultant segment of a pair of resultant segments that is proximate to the second endpoint of the road feature is to be labeled first with the next label when a parent segment that produced the pair of resultant segments is proximate the second endpoint while the other resultant segment of the pair of resultant segments that is distal to the second endpoint is to be labeled with a label subsequent the label of the proximate resultant segment.

25. The computer-implemented method of claim 21, further including adjusting the zoom level from the first zoom level to a second different zoom level and repeating steps 1, 2, 3, and 4 on a different portion of the road feature displayed at the second zoom level.

* * * * *